United States Patent
Lenz et al.

(10) Patent No.: US 8,155,861 B2
(45) Date of Patent: Apr. 10, 2012

(54) METHOD FOR CONTROLLING A FUEL SUPPLY SYSTEM OF AN INTERNAL COMBUSTION ENGINE

(75) Inventors: Andreas Lenz, Waiblingen (DE); Thomas Blattmann, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 562 days.

(21) Appl. No.: 12/256,116

(22) Filed: Oct. 22, 2008

(65) Prior Publication Data

US 2009/0138175 A1 May 28, 2009

(30) Foreign Application Priority Data

Oct. 22, 2007 (DE) .................... 10 2007 050 304

(51) Int. Cl.
*F02D 41/30* (2006.01)

(52) U.S. Cl. ...................... 701/103; 701/113

(58) Field of Classification Search .......... 123/456, 123/457, 459, 461, 491, 497, 516, 179.9, 123/179.12; 701/103, 113
See application file for complete search history.

(56) References Cited

U.S. PATENT DOCUMENTS

| | | | | |
|---|---|---|---|---|
| 3,946,712 A * | 3/1976 | Hatz et al. | ...................... | 123/447 |
| 5,513,614 A * | 5/1996 | Gras et al. | ..................... | 123/497 |
| 5,572,974 A * | 11/1996 | Wakeman | ..................... | 123/497 |
| 5,651,347 A * | 7/1997 | Oi et al. | ......................... | 123/487 |
| 5,927,253 A * | 7/1999 | Oyafuso et al. | ............... | 123/456 |
| 6,269,801 B1 * | 8/2001 | Channing | ..................... | 123/516 |
| 6,817,343 B1 * | 11/2004 | Greco et al. | ................. | 123/497 |
| 6,923,159 B2 * | 8/2005 | Sakumoto et al. | ............ | 123/446 |
| 7,093,576 B2 * | 8/2006 | DeRaad | .................. | 123/179.17 |
| 2002/0011238 A1 * | 1/2002 | Yomogida | .................... | 123/491 |
| 2004/0107947 A1 * | 6/2004 | Ichinose et al. | .............. | 123/491 |
| 2004/0211395 A1 * | 10/2004 | Greco et al. | ................. | 123/497 |

FOREIGN PATENT DOCUMENTS

EP 0 679 220 11/1995

* cited by examiner

*Primary Examiner* — Stephen K Cronin
*Assistant Examiner* — Arnold Castro
(74) *Attorney, Agent, or Firm* — Merchant & Gould, P.C.

(57) ABSTRACT

In a method for controlling a fuel supply system of an internal combustion engine with at least one combustion chamber, into which fuel can be injected via a fuel injector, the fuel injector being activated for the implementation of a normal start-up with specified injection parameters when the fuel supply system is filled, the specified injection parameters are modified for the acceleration of an initial start-up of the internal combustion engine when a filling of the fuel supply system with fuel has been implemented to evacuate the air from said fuel supply system.

10 Claims, 2 Drawing Sheets

METHOD FOR CONTROLLING A FUEL SUPPLY SYSTEM OF AN INTERNAL COMBUSTION ENGINE

TECHNICAL FIELD

The invention at hand relates to a method for controlling a fuel supply system of an internal combustion engine with at least one combustion chamber, into which fuel can be injected via a fuel injector, the fuel injector being activated for the implementation of a normal start-up with specified injection parameters when the fuel supply system has been filled.

BACKGROUND

In fuel supply systems of internal combustion engines, the fuel is normally delivered with the aid of an electric fuel pump. The electric fuel pump is activated with the aid of the control unit of the internal combustion engine, respectively provided with voltage. During start-up of the internal combustion engine, the fuel pump runs as long as the control unit detects that the starting switch is actuated. If the internal combustion engine has been started, the pump remains switched on. If, on the other hand, the control unit detects that the internal combustion engine has not been set in operation or that an inadmissible operating state prevails, a safety switch is activated, which prevents fuel from being delivered when the ignition is switched on and the internal combustion engine is shutdown. In so doing, it is assured that the delivery of fuel is quickly stopped as, for example, would be the case after an accident.

Because it is required that an adequate fuel pressure is available immediately during start-up of the internal combustion engine, there are fuel supply systems, wherein a priming of the fuel pump occurs, the fuel pump already being supplied with voltage prior to the start-up of the internal combustion engine. Such a fuel supply system with a priming of the fuel pump is, for example, described in the publication EP 0 679 220 B1.

This known fuel supply system implements a priming of the fuel pump, whereat a determination is additionally made whether the expected start-up of the internal combustion engine deals with a regular start-up or a start-up after an initial filling of the fuel supply system, i.e. for example an initial start-up or a start-up after an extended shutdown of the internal combustion engine or after a repair is made to the fuel supply system. Provided that a replenishment of fuel to the fuel supply system has been detected, the duration of the priming of the fuel pump is lengthened with respect to a normal start-up.

By the use of such extended pump priming times, the fuel supply system is as a rule only partially evacuated of air; and as a result, an already existing air cushion in said fuel supply system is compressed. This is especially true for an initial filling of the fuel supply system with fuel. Moreover, the lower pressure as well as the high pressure system is not sufficiently filled with fuel, so that a plurality of injections is still required in order to purge the fuel supply system via the combustion chambers. This then leads to a relatively long start-up time of more than 25 s, especially for the so-called "original start-up" after the initial filling of the fuel supply system with fuel.

SUMMARY

For that reason, the task of the invention at hand is to provide a method and an apparatus, which allow for a reduction in the start-up time, particularly in the case of the original start-up after the initial filling of the fuel supply system with fuel.

This problem is solved by a method for controlling a fuel supply system of an internal combustion engine with at least one combustion chamber, into which fuel can be injected via a fuel injector. The fuel injector is activated for the implementation of a normal start-up with specified injection parameters when the fuel supply system has been filled. The specified injection parameters are modified for the acceleration of an initial start-up of the internal combustion engine when a filling of the fuel supply system with fuel has been implemented to evacuate the air from said fuel supply system.

The invention consequently makes an accelerated evacuation of air from the fuel supply system possible when the internal combustion engine is initially being started, so that the start-up time can be reduced when the internal combustion engine is initially being started.

The specified injection parameters establish according to the invention the injected fuel quantities, which are injected by the fuel injector into the combustion chamber during a normal start-up. In so doing, the injected fuel quantities are increased when a filling of the fuel supply system with fuel is implemented to evacuate the fuel supply system of air.

In this way, the build-up of a minimum fuel pressure required for the initial start-up of the internal combustion engine can be accelerated; and in so doing, the air present in the fuel supply system can be more quickly forced out of it.

The specified injection parameters are preferably exposed to specified correction factors in order to increase the injected fuel quantities.

The invention can therefore be cost effectively implemented through a modification of system settings already being used.

The fuel injected into the combustion chamber is according to the invention delivered to the fuel injector from a fuel reservoir space, the specified correction factors being reduced if an actual fuel pressure prevailing in the fuel reservoir space exceeds an allotted pressure threshold value. The specified correction factors can be replaced with neutral values if the actual fuel pressure prevailing in the fuel reservoir space exceeds the pressure threshold value for a specified time period, so that the fuel injector is activated with the specified injection parameters.

A demand-oriented increase in the injected fuel quantities can consequently take place. Said increase is then always brought about if an evacuation of air from the fuel supply system is required; whereas the specified injection parameters are used during the normal operation of the internal combustion engine when the fuel supply system is deaerated.

The specified injection parameters can at least establish the injected fuel quantities, which are to be injected by the fuel injector into the combustion chamber during a start-up injection. The specified injection parameters can also at least establish the injected fuel quantities, which are to be injected by the fuel injector into the combustion chamber during a post start-up injection. The specified injection parameters can likewise at least establish the injected fuel quantities, which are to be injected by the fuel injector into the combustion chamber during a post start-up/warm-up injection.

In order to modify the specified injection parameter, the invention can consequently intervene into the injection processes, which are implemented by the fuel supply system, up until a complete evacuation of air from the fuel supply system is guaranteed.

The problem stated at the beginning of the application is also solved by a computer program for the implementation of a method for controlling a fuel supply system of an internal combustion engine with at least one combustion chamber, into which fuel can be injected via a fuel injector. The fuel injector is activated for the implementation of a normal start-up with specified injection parameters when the fuel supply system has been filled. The computer program modifies the specified injection parameters for the acceleration of an initial start-up of the internal combustion engine when a filling of the fuel supply system with fuel has been implemented to evacuate the air from said fuel supply system.

The problem stated at the beginning of the application is also solved by an internal combustion engine with at least one combustion chamber, into which fuel can be injected via a fuel injector. The fuel injector can be activated for the implementation of a normal start-up with specified injection parameters when the fuel supply system is filled. The specified injection parameters can be modified for the acceleration of an initial start-up of the internal combustion engine when a filling of the fuel supply system with fuel has been implemented to evacuate the air from said fuel supply system.

BRIEF DESCRIPTION OF THE DRAWINGS

An example of embodiment of the invention at hand is explained below in detail with the aid of the accompanying drawing. In so doing, the following are shown.

DETAILED DESCRIPTION

Figure 1:
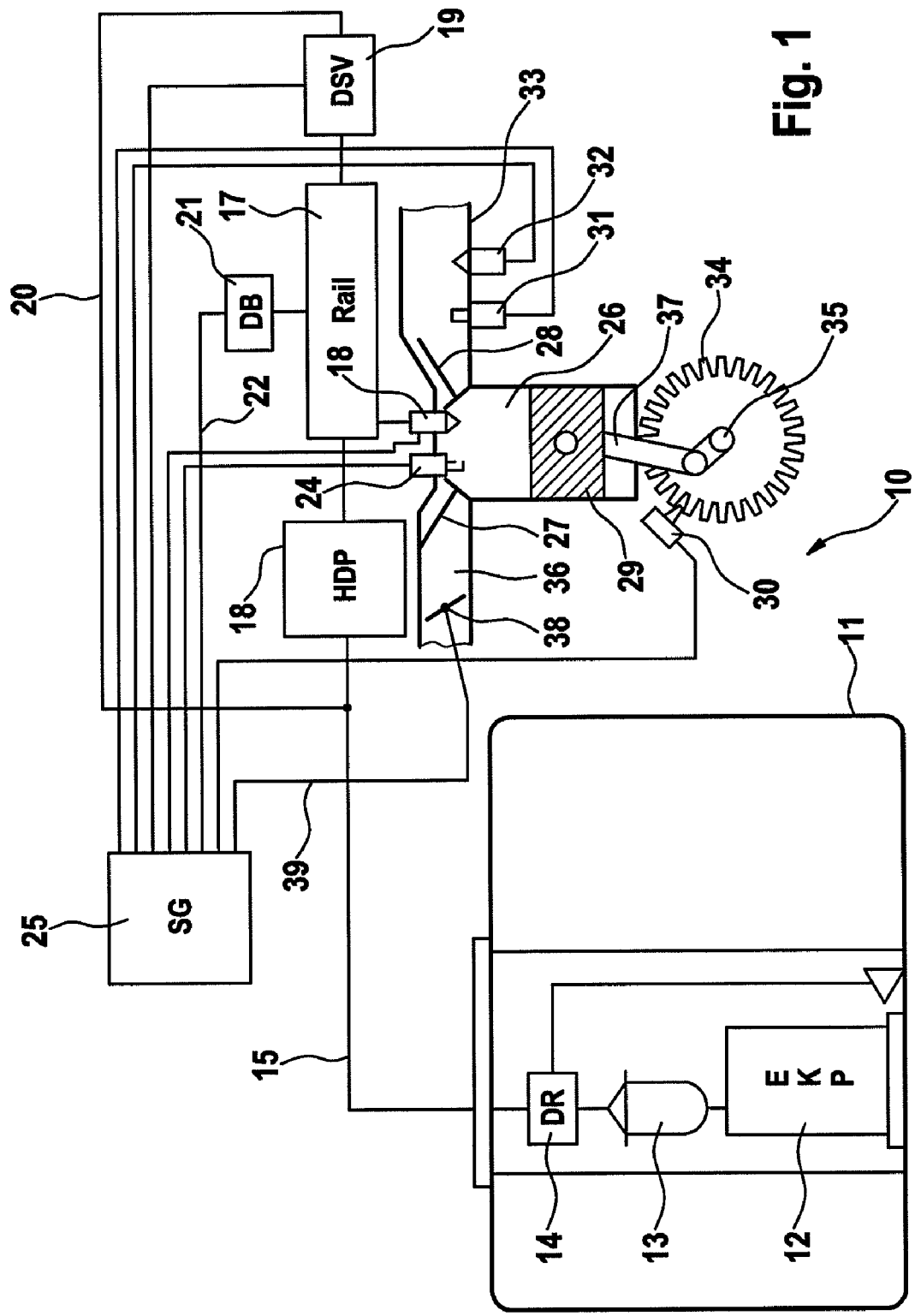
FIG. 1 is a schematic depiction of a fuel supply system of an internal combustion engine.

FIG. 1 shows a schematic depiction of a fuel supply system 10 with an individual cylinder of an internal combustion engine as well as the associated components. An internal combustion engine with direct fuel injection (Otto engine with direct gasoline injection BDE) is exemplary depicted with a fuel tank 11, whereat an electric fuel pump (EKP) 12, a fuel filter 13 and a low pressure regulator 14 are disposed. These constitute along with a fuel line 15, which attaches thereupon, a low pressure system.

The fuel line 15 leads from the fuel tank 11 to a high pressure pump 16. A fuel reservoir space, respectively rail 17, attaches to the high pressure pump 16. Fuel injectors 18, which preferably are assigned directly to the combustion chambers 26 of the internal combustion engine, are disposed at the fuel reservoir space 17. These components constitute a high pressure system.

Figure 2:
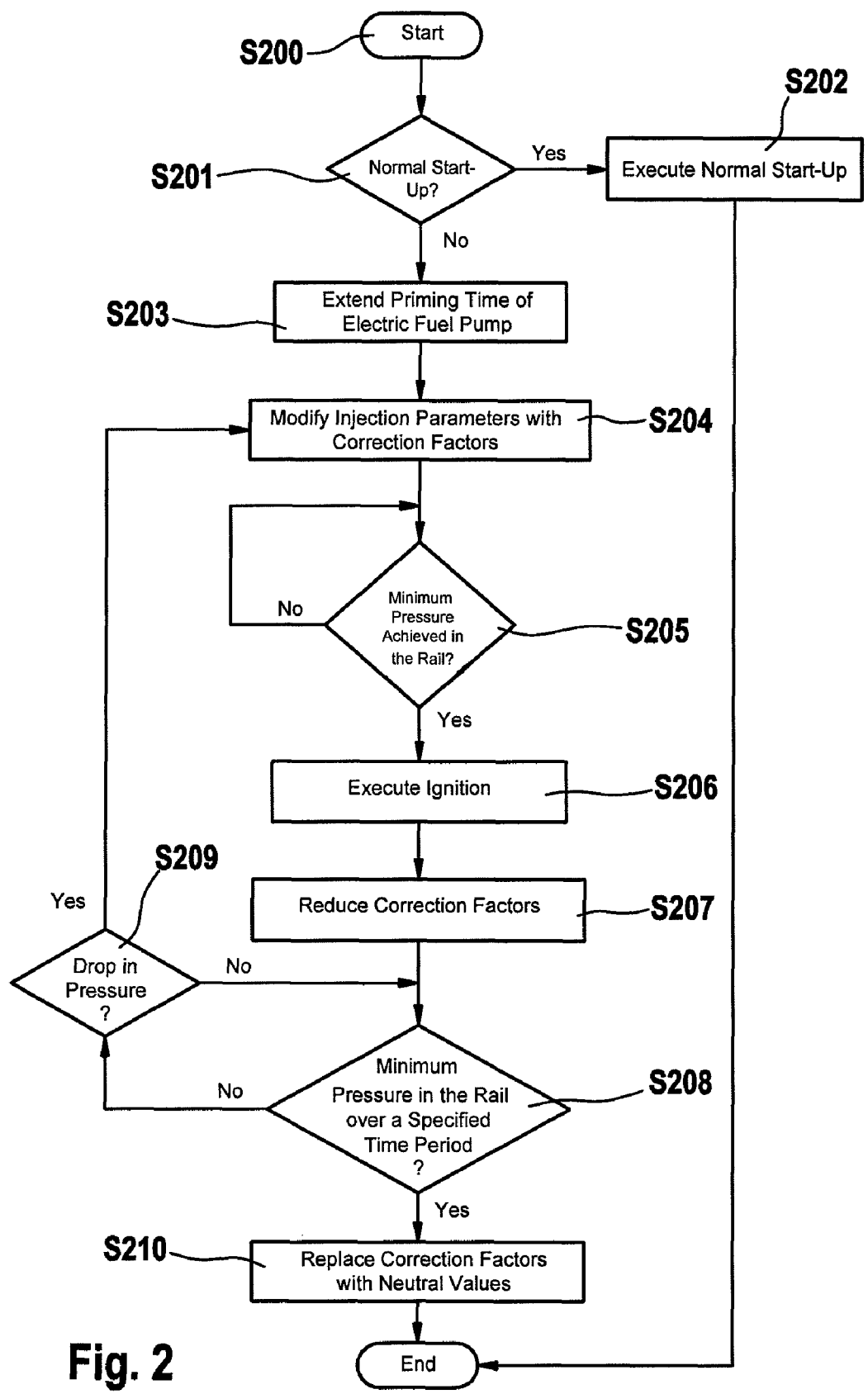
FIG. 2 is a schematic depiction of a method for controlling the fuel supply system of FIG. 1.

In the case of internal combustion engines with direct fuel injection, at least one fuel injector 18 is assigned to each combustion chamber 26, as is shown in FIG. 2. Provision can also be made in this instance for a plurality of fuel injectors 18 to be assigned to each combustion chamber 26.

The fuel is delivered by the electric fuel pump 12 from the fuel tank 11 to the high pressure pump 16 via the fuel filter 13 and the fuel line 15. The fuel filter 13 has the task of removing foreign particles from the fuel. With the aid of the low pressure regulator 14, the fuel pressure is set in a low pressure region of the fuel supply system to a predetermined value, which for the most part lies in the magnitude of approximately 4 to 5 bar. The high pressure pump 16, which is preferably actuated directly by the internal combustion engine, compresses the fuel and delivers it into the fuel reservoir space 17. The fuel pressure thereby achieves values of up to approximately 150 bar.

An individual combustion chamber 26 of an internal combustion engine with direct fuel injection is exemplary depicted in FIG. 1. The internal combustion engine generally has a plurality of cylinders with each having a respective combustion chamber 26. At least one fuel injector 18, at least one spark plug 24, at least one intake valve 27 and at least one exhaust valve are disposed at the combustion chamber 26. The combustion chamber is limited by a piston 29, which slides up and down in the cylinder.

Fresh air from an engine air intake 36 is drawn into the combustion chamber 26 via the intake valve 27. The fuel is directly injected into the combustion chamber 26 with the aid of the fuel injector 18. The fuel is ignited with the spark plug 24. The piston 29 is driven by the expansion of the ignited fuel. The movement of the piston 29 is transferred via a connecting rod 37 to a crankshaft 35. A segmental disc 34 is disposed on the crankshaft 35, which is swept by a rotational speed sensor 30. The rotational speed sensor 30 produces a signal, which characterizes the rotational motion of the crankshaft 35.

Exhaust gases arising during combustion travel out of the combustion chamber 26 via the exhaust valve 28 to an exhaust pipe 33, wherein a temperature sensor 31 and a lambda probe 32 are disposed. The temperature of the exhaust gases is acquired with the aid of the temperature sensor 31, and the oxygen content of the exhaust gases is acquired with the aid of the lambda probe 32.

A pressure sensor 21 and a pressure control valve 19 are attached at the fuel reservoir space 17. The pressure control valve 19 is connected to the fuel reservoir space 17 on the inlet side. A return flow line 20 leads to the fuel line 15 on the outlet side. Instead of the pressure control valve 19, a quantity control valve can also be used in the fuel supply system 10.

With the aid of the pressure sensor 21, the actual value of the fuel pressure in the fuel reservoir space 17 is acquired and provided to a control unit 25. An activation signal, with which the pressure control valve is activated, is generated by the control unit 25 on the basis of the actual value of the fuel pressure, which was acquired. The fuel injectors 18 are activated via non-depicted electric end stages, which can be disposed inside of or outside of the control unit 25. The different actuators and sensors are connected to the control unit 25 via the control system signal lines 22.

Different functions, which provide a basis for controlling the internal combustion engine, are implemented in the control unit 25. These functions are programmed on a computer in modern control units and subsequently deposited in a memory of the control unit 25. The functions deposited in the memory are activated as a function of the demands placed on the internal combustion engine. In this regard, particularly severe demands are placed on the real-time capability of the control unit 25. In principle, a pure hardware implementation of the control system of the internal combustion engine is an alternative possibility to a software implementation.

A throttle valve 38 is disposed in the engine air intake 36. The rotational position of said throttle valve 38 can be adjusted by the control unit 25 via a signal line 39 and an associated electrical actuator, which is not depicted here.

In a first mode of operation, the homogeneous operation of the internal combustion engine, the throttle valve 38 is partially opened, respectively closed, as a function of the desired air mass to be supplied. The fuel is injected by the fuel injector 18 into the combustion chamber 26 during an intake phase, which is initiated by the piston 29. The injected fuel is swirled by the air, which is simultaneously drawn into the combustion chamber 26, and said fuel is for this reason essentially equally/homogeneously distributed in the combustion chamber 26. The fuel/air mixture is subsequently compressed during a compression phase, wherein the volume of the combustion chamber 26 is reduced by the piston 29. Said fuel/air mixture is then ignited by the spark plug 24 as a rule shortly before the piston 29 achieves top dead center.

In a second mode of operation, the stratification operation of the internal combustion engine, the throttle valve 38 is widely opened. The fuel is injected by the fuel injector 18 into the combustion chamber 26 during the compression phase brought about by the piston 29. The fuel is then ignited as before with the aid of the spark plug 24, so that the piston 29 is driven in the ensuing power phase by the expansion of the ignited fuel. A further possible mode of operation is the homogeneous lean operation, in which fuel is injected into the combustion chamber 26 during the air intake phase just as in the homogeneous engine operation.

During the injection process, the pressure in the rail 17 and thereby on the rail side of the fuel injector 18 is greater than in the combustion chamber 26. Only in this way can fuel be injected into the combustion chamber 26.

In the case of an original start-up or an initial start-up of the internal combustion engine, which as a rule is implemented in the engine plant or in the motor vehicle assembly works, the air in the low and high pressure system has to initially be evacuated by means of an initial filling of the fuel supply system with fuel. This evacuation is performed in order to prevent damage to the internal combustion engine and is also required in a so-called "partially filled system", i.e. in a system, which is partially, but not completely evacuated of air. This can be the case with regard to a fuel supply system of an internal combustion engine, which has not been used for an extended period of time, or after a repair has been made to the fuel supply system.

A method for controlling the fuel supply system 10 of FIG. 1 is subsequently described in detail with respect to it being evacuated of air and filled with fuel according to an embodiment of the invention. Reference is thereby made to FIGS. 1 and 2. This method can likewise be applied to a diesel engine. In relationship to the Otto engine depicted in FIG. 1, the spark plug 24 with its associated components as well as the lambda probe 32 is omitted.

FIG. 2 shows a flow diagram of a method 200 for controlling the fuel supply system 10 of FIG. 1, said method 200 being used to accelerate an initial start-up of the internal combustion engine during a filling of said system with fuel, which is implemented in order to evacuate the air from the fuel supply system. In this connection, a detailed explanation of known procedural steps from the technical field will be omitted.

According to a preferred embodiment of the invention, the method is implemented as a computer program, which can be executed by a suitable open-loop or closed-loop control device (for example control unit 25), for which provision has already been made in the internal combustion engine. The invention can thus be simply and cost effectively implemented with components, which are already present in the internal combustion engine.

The method 200 begins at step S201, whereat a start-up request takes place and a determination is made whether a normal start-up or an initial start-up is intended in this instance. A start-up request for a normal start-up exists if the fuel supply system 10 is already filled and the fuel supply system 10 does not need to be evacuated of air before being placed in operation. Within the context of the invention at hand, a start-up request for an initial start-up is then present if the fuel supply system 10 is not filled or is partially filled. In this case, an initial filling is required to completely evacuate the air from the system, or a replenishment of fuel is required for the partial evacuation of the fuel supply system.

If it is determined in step S201 that a normal start-up is to be executed, this is executed in step S202. Otherwise the method 200 continues in step S203 in order to execute the control of the fuel supply system 10 according to the invention for the evacuation of air from said system.

In step S203 the priming time of the electric fuel pump (EKP) 12 is initially extended, for example to a time duration between 10 s and 20 s and preferably to a duration of 15 s. In step S204 the injection parameters specified for the internal combustion engine are modified. These establish injected fuel quantities according to the invention, which are injected by the fuel injector 18 into the combustion chamber 26 during a normal start-up. In this connection, the fuel quantities to be injected by the fuel injector into the combustion chamber 26 can according to the invention at least be modified for a start-up injection, a post start-up injection and/or a post start-up/warm-up injection.

During a filling of the fuel supply system with fuel, which is implemented to evacuate the air from the fuel supply system 10, these injected fuel quantities are increased. For this purpose, said injected fuel quantities are exposed to specified correction factors in step S204 according to an embodiment of the invention.

It is determined in step S205 whether an actual fuel pressure prevailing in the fuel reservoir space 17 exceeds an allotted pressure threshold value. An ascertainment can thus be made whether a minimum fuel pressure, which is required for starting the internal combustion engine, was built up in the fuel supply system 10 by means of the extended priming time in step S203 and the increased injected fuel quantities in step S204; so that an ignition of the internal combustion engine is possible. The method accordingly waits in step S205 until this minimum fuel pressure is built up and than proceeds in step S206.

The internal combustion engine is ignited in step S206, i.e. the fuel injected into the combustion chamber 26 of the internal combustion engine is ignited by the spark plug 24. In step S207 the specified correction factors are reduced in order to prevent too much fuel from being injected into the combustion chamber 26.

It is determined in step S208 whether the prevailing actual fuel pressure in the fuel reservoir space 17 has exceeded the pressure threshold value for a specified time period. This determination serves the purpose of ascertaining whether the operation of the internal combustion engine after the ignition in step S206 took place at the high pressure level for an applicable time period. If this is the case, this is an indication of a stable running of the internal combustion engine, so that the specified correction factors in step S210 can be replaced with neutral values. In this way, an activation of the fuel injector 10 with the injection parameters specified for the normal operation is made possible. Otherwise the method 200 continues on in step S209.

It is determined in step S209 whether the fuel pressure produced in the fuel reservoir space 17 has dropped below the allotted pressure threshold value. If this is the case, it is assumed that a drop in pressure has occurred, and the method 200 returns to step S204. Otherwise the method 200 returns to step S208.

The invention claimed is:

1. A method of controlling a fuel supply system of an internal combustion engine having at least one combustion chamber, wherein a fuel is injected into the at least one combustion chamber via a fuel injector, and wherein upon a normal start-up of the internal combustion engine the fuel injector is activated with at least one specified injection parameter when the fuel supply system is filled, the method comprising:

modifying the at least one specified injection parameter to accelerate an initial start-up of the internal combustion engine, wherein upon implementation of the initial start-up air is evacuated from said fuel supply system by filling the fuel supply system with fuel;

measuring a pressure in the fuel supply system; and igniting the injected fuel when a minimum pressure is achieved in the fuel supply system.

2. A method according to claim 1, further comprising modifying the least one specified injection parameter such that an injected fuel quantity is increased upon filling of the fuel supply system with fuel to evacuate air from said fuel supply system, wherein the at least one specified injection parameter establishes a fuel quantity that is injected by the fuel injector into the combustion chamber during a normal start-up.

3. A method according to claim 2, further comprising adjusting the at least one specified injection parameter by a specified correction factor to increase the injected fuel quantity.

4. A method according to claim 3, further comprising delivering the fuel to the fuel injector from a fuel reservoir space, wherein the specified correction factor is reduced if an actual fuel pressure prevailing in the fuel reservoir space exceeds an allotted pressure threshold value.

5. A method according to claim 4, further comprising replacing the specified correction factor with a neutral value upon the actual fuel pressure in the fuel reservoir space exceeding the pressure threshold value for a specified time period such that the fuel injector is activated with the at least one specified injection parameter.

6. A method according to claim 1, wherein the at least one specified injection parameter at least establishes an injected fuel quantity to be injected by the fuel injector into the at least one combustion chamber during a start-up injection.

7. A method according to claim 1, wherein the at least one specified injection parameter at least establishes an injected fuel quantity to be injected by the fuel injector into the at least one combustion chamber during a post start-up injection.

8. A method according to claim 1, wherein the at least one specified injection parameter at least establishes an injected fuel quantity to be injected by the fuel injector into the at least one combustion chamber during a post start-up/warm-up injection.

9. A computer program product with a program code stored on a machine-readable medium and executed by an open-loop or a closed-loop control device for controlling a fuel supply system of an internal combustion engine with at least one combustion chamber, wherein fuel is injected into the at least one combustion chamber via a fuel injector, and wherein upon a normal start-up of the internal combustion engine the fuel injector is activated with at least one specified injection parameter when the fuel supply system is filled, the program code including instructions for modifying the at least one specified injection parameter to accelerate an initial start-up of the internal combustion engine, wherein upon implementation of the initial start-up air is evacuated from said fuel supply system by filling the fuel supply system with fuel;

measuring a pressure in the fuel supply system; and igniting the injected fuel when a minimum pressure is achieved in the fuel supply system.

10. An internal combustion engine comprising:

at least one combustion chamber;

a fuel injector to inject fuel into the at least one combustion chamber, wherein the fuel injector is actuatable, for the implementation of a normal start-up of the internal combustion engine, with at least one specified injection parameter when a fuel supply system is filled, and wherein the at least one specified injection parameter is modifiable for an acceleration of an initial start-up of the internal combustion engine when a filling of the fuel supply system with fuel has been implemented to evacuate air from said fuel supply system;

a pressure sensor configured to measure a pressure in the fuel supply system; wherein the injected fuel is ignited when a minimum pressure is achieved in the fuel supply system.

* * * * *